March 28, 1967 G. V. SMITH ETAL 3,311,782
ELECTRO-EROSION APPARATUS WITH MEANS TO INTERRUPT SHORT CIRCUIT ACROSS GAP ONLY AFTER DURATION OF POWER PULSE
Filed July 9, 1965 2 Sheets-Sheet 1

INVENTORS
Gordon Victor Smith
BY Eric John Ward
Shoemaker and Mattare
ATTORNEYS

March 28, 1967 G. V. SMITH ETAL 3,311,782
ELECTRO-EROSION APPARATUS WITH MEANS TO INTERRUPT SHORT CIRCUIT ACROSS GAP ONLY AFTER DURATION OF POWER PULSE
Filed July 9, 1965 2 Sheets-Sheet 2

INVENTORS
Gordon Victor Smith
BY Eric John Ward
Shoemaker and Mattare
ATTORNEYS

United States Patent Office 3,311,782

Patented Mar. 28, 1967

3,311,782

ELECTRO-EROSION APPARATUS WITH MEANS TO INTERRUPT SHORT CIRCUIT ACROSS GAP ONLY AFTER DURATION OF POWER PULSE

Gordon Victor Smith, Highnam, and Eric John Ward, Gloucester, England, assignors to Sparcatron Limited, Stafford, England, a British company Filed July 9, 1965, Ser. No. 470,827
Claims priority, application Great Britain, Feb. 19, 1965, 7,288/65
4 Claims. (Cl. 315—225)

Figure 1:
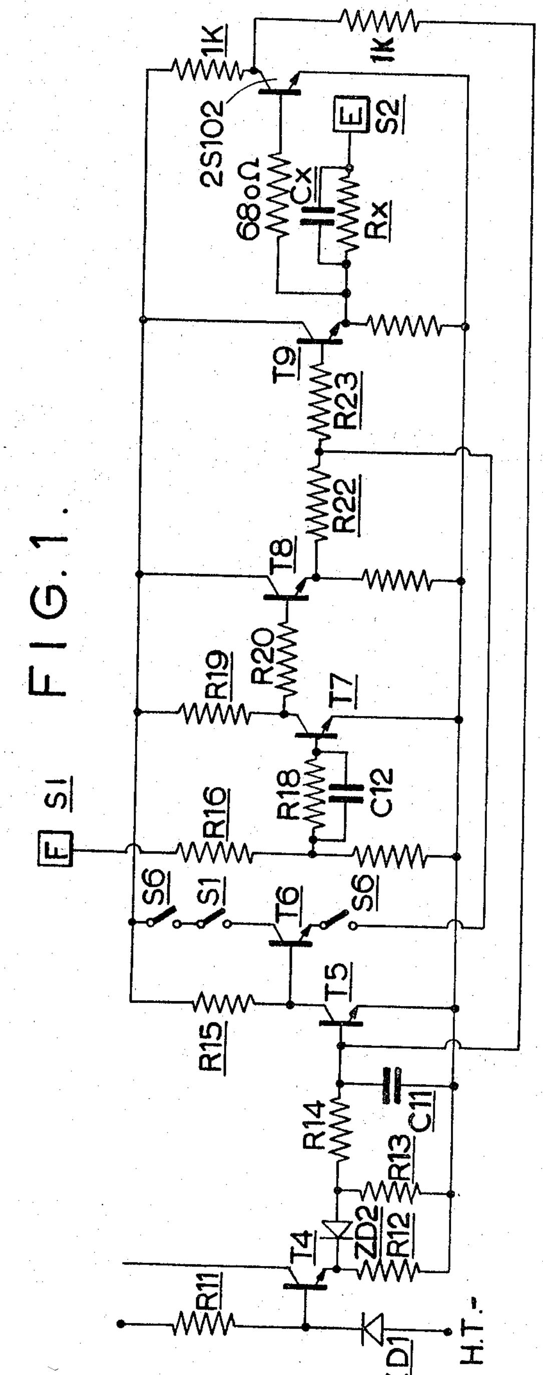

This invention relates to methods and apparatus for the electro-erosion machining of electrically conductive materials by causing intermittent time-spaced electric power pulse discharges to pass across the gap maintained between tool electrode and workpiece, and in particular to electro erosion apparatus in which said intermittent discharges are produced with the aid of switching elements, such as transistors or magneto-resistive elements or silicon controlled rectifiers as referred to in U.S. Patents 2,876,386 and 3,020,448 and the specification of copending application Ser. No. 232,466, filed Oct. 23, 1962, and now abandoned.

In apparatus of this kind it is essential to avoid operational difficulties, danger to equipment and damage to tool electrode and workpiece due to accidental short circuits between tool electrode and workpiece if these short-circuits persist for a number of power pulses. Avoidance of this condition may be achieved by making provision for the reduction in electric power delivery into the working gap between electrode and workpiece, while it is short-circuited and it is an object of the present invention to provide an improved method and arrangement for reducing such power delivery into the spark gap during short-circuit conditions.

In a typical electro-erosion unit employing power transistors such as referred to in the specification of copending application Ser. No. 232,466, referred to above and chosen to describe the present invention by way of example, a number of power transistors are arranged in parallel circuit arrangement to feed power pulses into the gap between electrode and workpiece.

In arrangements according to the present invention, the circuit is so arranged that all transistors feed power pulses into the gap as long as no short-circuit conditions exist in the gap, while only a reduced number of these transistors are permitted to feed power pulses into the gap while short-circuit conditions are prevailing, the balance of the transistors being rendered inoperative.

In the following example it is assumed that of a total number of twelve transistors in parallel, only three are arranged to feed power pulses into the gap at all times, while the remaining nine transistors are rendered inoperative whenever short-circuit conditions arise. The pulsed signals fed to the power transistors are produced by a multivibrator or oscillator, with variable frequency and on/off ratio and are passed successively into an amplifier, pre-driver and driver and finally to the three power transistors in parallel circuit arrangement, which in turn produce power pulses across the gap between workpiece and electrode.

The pulsed signals are also fed via a phase-inverter and buffer stage to a gate circuit, the features and arrangement of which form the substance of the present invention.

If the aforementioned gate circuit is "open" then the pulsed signals are also fed to the aforesaid nine power transistors so that these become operative in parallel circuit with each other, and together with the aforementioned three power transistors deliver electric power pulses into the gap.

But when the gate circuit is "closed," then no signals are passed to the nine power transistors and they remain inoperative. To achieve this mode of operation, a gap-condition signal is derived from the spark gap when normal gap conditions prevail; but when short-circuit conditions exist in the gap, then no signal will be given. The signal when it occurs is used to open the gate circuit. Thus under normal gap conditions the gap circuit will be open and will cause the nine transistors to deliver power in parallel with the three transistors to the working gap; while when the gate is closed because no signal is received from the spark gap due to short-circuit conditions prevailing in the gap, the nine transistors will remain inoperative, so that only the aforementioned three power transistors are in operation, and power passing through the spark gap is therefore reduced.

It is a feature of the present invention that the gate is locked "open" for the total duration of a pulse, and that upon termination of said pulse the gate is "closed"; and if no signal is received from the spark gap due to short-circuit conditions at the commencement of the next pulse, the gate will remain closed until the short-circuit is removed. Thus, it is ensured that the gate cannot be closed during a power pulse, while if it is open at the commencement of a power pulse, then it will remain so for the entire duration of that pulse. Suppression of the operation of the aforesaid nine power transistors in the example given above will therefore occur only when a short circuit exists prior to the commencement of a power pulse.

Figure 2:
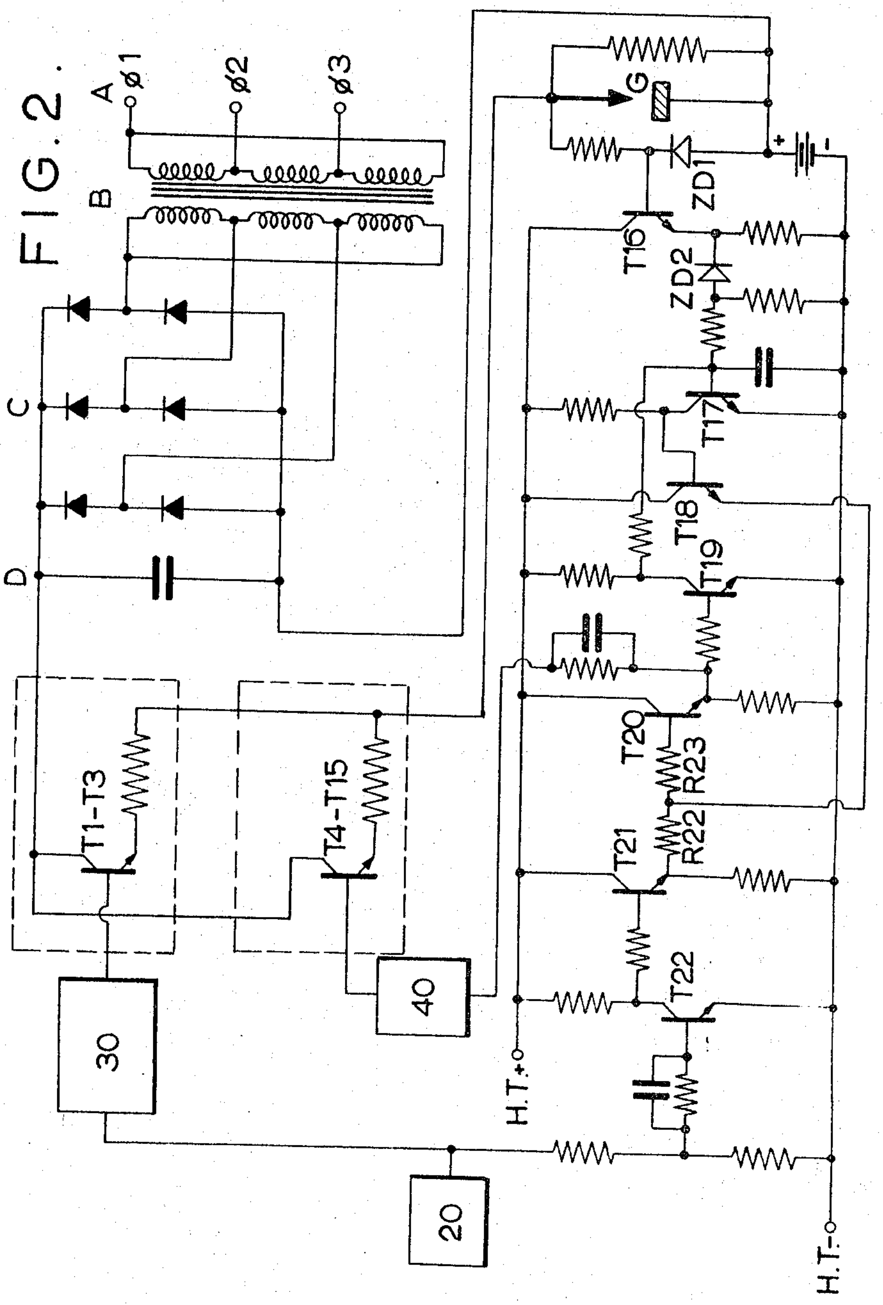

Reference will now be had to the accompanying drawings where two arrangements are illustrated and wherein:

FIGURE 1 is a circuit diagram of the suppression arrangement already described, and FIGURE 2 shows another form of suppression circuit.

Referring first to FIGURE 1, the signal from an oscillator amplifier is fed in at point F and the signal pulses are fed via transistors T7, T8 to gating transistor T9. If the junction of resistors R22 and R23 is not switched to H.T. potential, the oscillator signal will pass on to the output stages via point E and the nine aforementioned power transistors (not shown) are thus made operative in parallel with the aforementioned three power transistors to feed power pulses into the spark gap. The spark gap condition signal is fed into the circuit via transistors T4, T5 and T6; and it is arranged that if no pulsed discharges occur across the spark gap due to a short circuit, the potential at the junction of resistors R22 with resistor R23 is raised to H.T., thus oppressing the output at E. There is provided a positive feedback from the output of transistor T9 via a further transistor 2S102 back to the spark gap control circuit at the input of transistor T5.

If a pulse has appeared at the spark gap, thus allowing the signal pulse from the oscillator to pass through transistor T9, the positive feedback signal from transistor 2S102 will ensure that the gate is locked "open" and if no signal is received from the spark gap due to a short-circuit prevailing at the commencement of the subsequent pulse, the gate will remain "closed" until the short-circuit is removed.

This mode of operation, according to the present invention, therefore ensures that the gate cannot be closed during the duration of a power pulse, and operation of the nine transistors is therefore suspended only when a short circuit exists before the commencement of a pulse.

In FIGURE 2, A is a main input feeding a main transformer B, rectifier bank C and capacitor bank D. Working gap G of a spark erosion unit is supplied with power pulses via transistors T1 to T15. An oscillator 20 with variable frequency and mark-space ratio (that is the ratio of the period when the pulse is on to when it is off) is arranged to feed low power pulses via a power amplifier 30 to the base circuits of transistors T1 to T3. This portion of the circuit is operated at all times even when short circuit conditions are prevailing across the gap G. Power pulses via transistors T4 to T15 are provided only when short-circuit conditions are not prevailing across the gap G.

The low power signal from the oscillator 20 is fed via a pulse inverter T22 and buffer stage T21 to a gating transistor T20. Provided the junction of resistors R22 and R23 is not raised to H.T., the pulses will pass through the gating transistor T20 to the base circuits of transistors T4 to T15 via one or more power amplifiers 40.

Should voltage pulses across the gap G disappear or fall below a selected level, determined by the striking potentials of Zener diodes ZD1 and ZD2, transistor T16 will be cut off and collector of transistor T17 raised to H.T. potential. In this manner, transistor T18 will be switched on and the junction of R22 and R23 raised to H.T. thus preventing pulses from transistor T21 being transmitted via transistor T20 to power transistors T4 to T15.

A feature of the circuit is a positive feedback from the emitter of transistor T20 via amplifier T19 to the base of transistor T17. This feedback ensures that, if a short circuit occurs across the gap G during a power pulse the gate transistor T20 will remain "open" until the end of the pulse. If, however, no further pulse is initiated across the gap G due to a short circuit, the transistor T20 will remain "closed" and power pulses via transistors T4 to T15 will not be applied. Thus it can be seen that the positive feedback via transistor T19 acts as a lock device preventing the suppression circuit from operating except before the commencement of a power pulse.

It will be appreciated that each power transistor shown may represent a bank of any appropriate number of transistors depending on the machining power required.

We claim:

1. Electro-erosion machining apparatus for machining a conductive workpiece by discrete electric discharges across a gap between an electrode and the workpiece, comprising (a) a source of unidirectional voltage;
(b) semiconductor means having control means and being connected in series circuit with said source and with the electrode and workpiece defining said gap;
(c) means for generating discrete control pulses and being connected to periodically forward-bias said semiconductor control means to modulate the supply of current to the gap;
(d) gate means connected between said generating means and said semiconductor control means and when conductive passing said control pulses to the latter;
(e) means for normally rendering said gate means conductive;
(f) means for sensing short-circuiting of said gap and for blocking said gate means in response thereto; and
(g) means to render said blocking means inoperative after initiation of each control pulse and for its duration.

2. In apparatus according to claim 1, said gate means being normally non-conductive, and said means for rendering the gate means conductive comprising a feedback signal responsive to the generation of each control pulse, said means remaining non-conductive in the absence of such a signal.

3. Electro-erosion machining apparatus for machining a conductive workpiece by discrete electric discharges across a gap between an electrode and the workpiece, comprising (a) a source of unidirectional voltage;
(b) multiple semiconductor means each having control means and being all connected in series circuit with said source and with the electrode and workpiece defining said gap;
(c) means for generating discrete control pulses and being connected directly to some of said semiconductor control means to forward-bias them to modulate the supply of current to the gap;
(d) gate means connected between said generating means and the remainder of said semiconductor control means and when conductive also forward-biasing the latter;
(e) means for normally rendering said gate means conductive;
(f) means for sensing short-circuiting of said gap and for blocking said gate means in response thereto; and
(g) means to render said blocking means inoperative after initiation of each control pulse and for its duration.

4. In apparatus according to claim 3, said gate means being normally non-conductive and said first mentioned semiconductor means supplying a pulsating discharge across said gap for each control pulse generated; and said means for rendering the gate means conductive comprising a path for feeding back to said gate means energy corresponding with each pulsating discharge across said gap, whereby when said gap is short-circuited no energy is fed back through said path to render the gate means conductive.

References Cited by the Examiner

UNITED STATES PATENTS

| | | | |
|---|---|---|---|
| 2,951,969 | 9/1960 | Matulaitis et al. | 315—163 |
| 3,018,411 | 1/1962 | Webb | 315—163 |
| 3,178,551 | 4/1965 | Webb | 219—69 |
| 3,257,580 | 6/1966 | Webb | 315—127 |

JOHN W. HUCKERT, *Primary Examiner.*

J. SHEWMAKER, *Assistant Examiner.*